United States Patent

[11] 3,581,655

| [72] | Inventor | Fred Hausmann<br>Basel, Switzerland |
|---|---|---|
| [21] | Appl. No. | 839,607 |
| [22] | Filed | July 7, 1969 |
| [45] | Patented | June 1, 1971 |
| [73] | Assignee | Glomera A.G.<br>Basel, Switzerland |
| [32] | Priorities | July 18, 1968 |
| [33] | | Great Britain |
| [31] | | 34414/68;<br>July 9, 1968, Switzerland, No. 10275/68 |

[54] PRESS FOR MANUFACTURING CYLINDRICAL OBJECTS FROM LOOSE FIBROUS OR PARTICULATE MATERIAL
7 Claims, 3 Drawing Figs.

[52] U.S. Cl............................................................ 100/97,
18/12, 100/93, 100/189, 100/191, 107/14
[51] Int. Cl....................................................... B30b 15/08
[50] Field of Search........................................... 100/97,
138, 139, 93 P, 148, 149, 191, 192, 188, 189, 95,
96, 98; 18/12 P; 107/14 P

[56] References Cited
UNITED STATES PATENTS
| 537,909 | 4/1895 | Stauber | (100/97UX) |
| 1,463,094 | 7/1923 | Rigby | (100/139UX) |
| 2,296,516 | 9/1942 | Goss | (100/139UX) |
| 2,507,491 | 5/1950 | Crea | (100/139UX) |
| 3,006,272 | 10/1961 | Brady | 100/93 |

FOREIGN PATENTS
| 803,860 | 4/1951 | Germany | 100/139 |

*Primary Examiner*—Billy J. Wilhite
*Attorney*—Werner W. Kleeman

ABSTRACT: A press for manufacturing cylindrical objects from loose fibrous or particulate material comprising a feed apparatus for the material to be pressed having a housing with a funnel-shaped infeed part and a cylindrical feed part closely surrounding at least the end portion of a conveyor means which is provided at its end with cutting means for the material to be pressed; a thruster mechanism mounted at the end of said cylindrical part of the feed apparatus housing to discharge material therefrom through a discharge opening and having a plunger means driven for moving back and forth transversely through said cylindrical part of the feed apparatus housing thereby alternately blocking and freeing the outlet opening of said cylindrical part of the feed apparatus housing; and a cylindrical die mounted at said discharge opening in alignment with said plunger means.

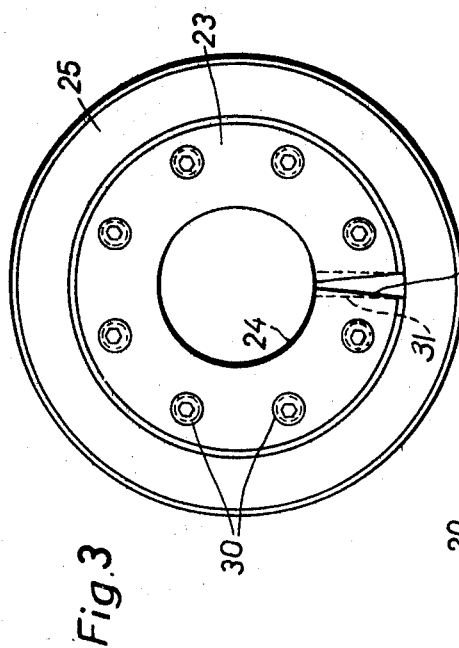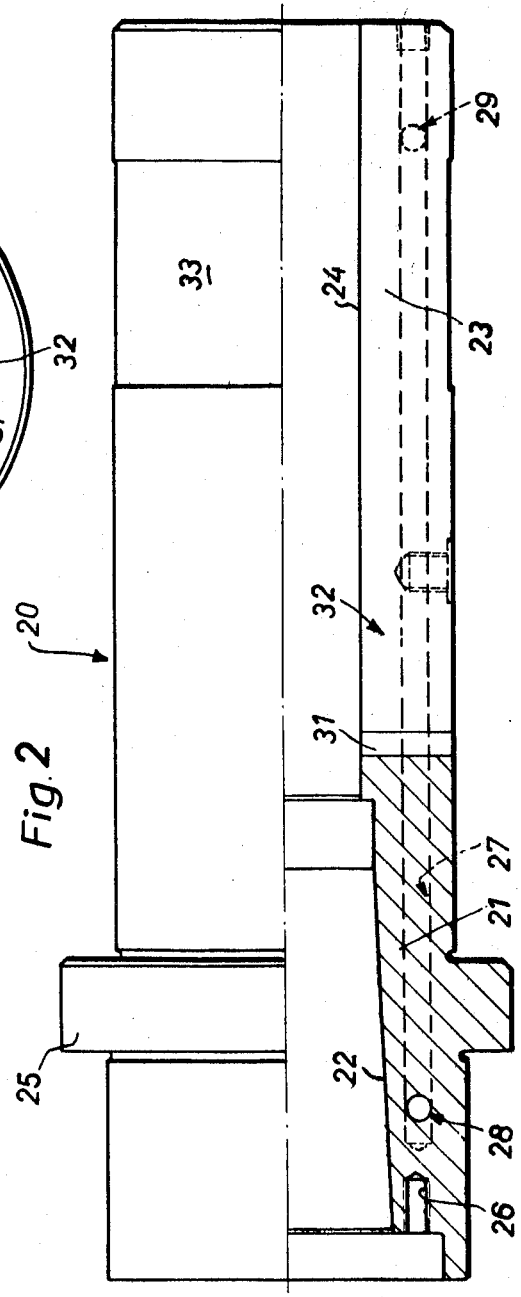

PRESS FOR MANUFACTURING CYLINDRICAL OBJECTS FROM LOOSE FIBROUS OR PARTICULATE MATERIAL

The invention relates to presses for manufacturing cylindrical objects from loose fibrous or particulate material, and particularly to briquetting presses, having a feed apparatus for the material to be pressed and a press cylinder or die at the outlet end of the feed apparatus.

It is an object of the present invention to provide a press of this kind which is particularly suitable for treating, that is to say pressing or briquetting fibrous or particulate materials.

The press according to the invention comprises a feed apparatus for the material to be pressed having a housing with a funnel-shaped infeed part and a cylindrical feed part closely surrounding at least the end portion of a conveyor means which is provided at its end with cutting means for the material to be pressed; a thruster mechanism mounted at the end of said cylindrical part of the feed apparatus housing to discharge material therefrom through a discharge opening and having a plunger means driven for moving back and forth transversely through said cylindrical part of the feed apparatus housing, thereby alternately blocking and freeing the outlet opening of said cylindrical part of the feed apparatus housing; and a cylindrical die mounted at said discharge opening in alignment with said plunger means.

In the feed apparatus a positive feed of the materials to be treated takes place in the cylindrical part of the housing, so that a precompression of these materials is realized. The plunger of the thruster mechanism receives the precompressed materials and conveys them to the moulding die of the press. When the outlet opening of the cylindrical part of the housing is temporarily blocked, as a result of the reciprocating movement of the plunger, the material is further compressed by the continuously operating worm conveyor, so that this material immediately enters the space vacated by the plunger when the latter carries out the return (reverse) part of its working stroke. Owing to the provision of the cutting means, it is ensured that so-called bridge formation will not occur, particularly when fibrous waste materials or vegetable waste are being treated and that an excessively large pressure increase will not take place in the whole lower part of the worm conveyor, these cutting means continuously cutting through the precompressed material.

It is a further object of the present invention to provide a press of the kind set out hereinabove and wherein the jacket of said cylindrical die or press cylinder is provided with at least one continuous slot extending from near the entrance of the discharge part to the outlet end of the cylinder, this slot, as seen in cross section, opening from the inside of the jacket to the outside thereof.

Such a slot enables the diameter of the cylinder to be adjusted by means of a hydraulic device and consequently enables a variable surface pressure to be produced on the material to be pressed.

The embodiment of the press cylinder provided with a slot which, in cross section, opens from the inside to the outside and which is located on the lower side of the cylinder, is particularly advantageous since small particles which may possibly penetrate outwardly through the slot (the material to be pressed consists for example of fibrous material, chips or the like) can fall freely through the opening gap, so that adjustability is always ensured (the slot can always be closed completely).

An embodiment of a press according to the invention is shown in the drawing and is briefly described below.

FIG. 2 shows an enlarged view of a press cylinder, partly in section, and

Figure 1:
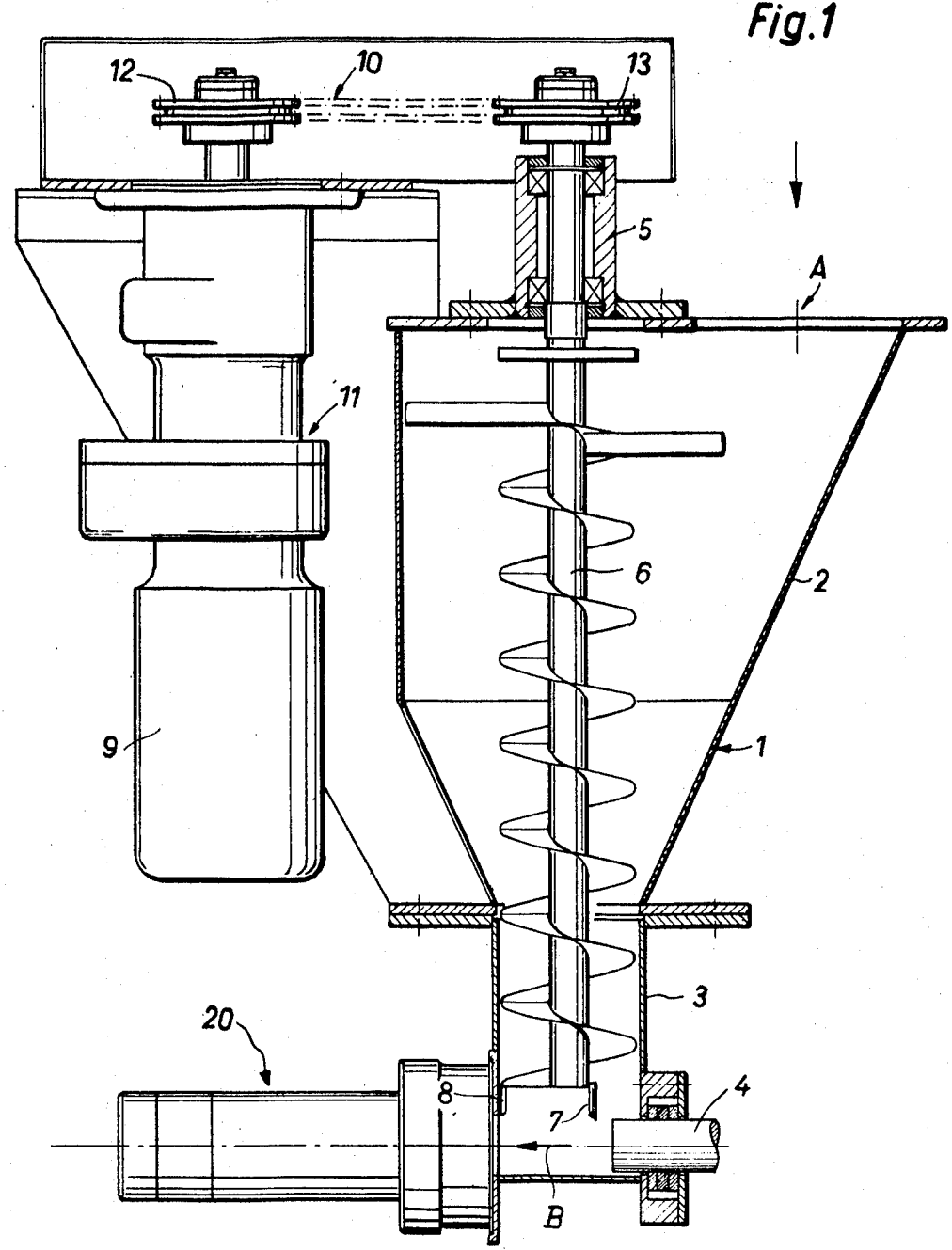
FIG. 1 shows, in partial section, a briquetting press.

FIG. 3 a view, from the right, of the cylinder shown in FIG. 2.

The feed apparatus of the press shown in FIG. 1 essentially consists of a vertical housing 1 whose inlet or infeed portion 2 is downwardly tapered in funnel-shaped manner. In its lower part the feed housing 1 is constituted by a cylindrical part 3. A thruster mechanism for discharging the material is provided at the lower end of housing part 3 and essentially consists of a plunger 4 which can be moved horizontally back and forth through the housing part 3.

A worm conveyor 6 which is guided in a bearing block 5 located at the head of the inlet (infeed) part 2 of the housing serves to downwardly convey the material to be treated. The cylindrical part 3 of the housing surrounds the lower part of the worm conveyor 6 with only a slight gap therebetween.

The lower part of the worm conveyor 6 is located above the plunger 4, with a distance therebetween, when the plunger 4 is in its front dead center position. Two vertically downwardly projecting knives 7 and 8 are arranged at the end of the worm conveyor 6 and move about circular paths which are concentric with the axis of the worm conveyor and of different radii.

The worm conveyor 6 is driven by a motor 9, through the intermediary of a chain transmission 10 for example.

An infinitely variable transmission 11 is interposed in the drive of the worm conveyor 6, thus enabling this drive to be modified as required so as to enable the apparatus to convey materials of widely differing nature which are to be pressed or briquetted. Further, by interchanging the sprocket wheels 12 and 13 the speed of the drive can either be progressively increased or decreased.

In the course of operation of the apparatus the material to be briquetted is introduced at A into the feed housing 1 and, supported by the worm conveyor 6, is downwardly conveyed. The material to be briquetted is precompressed owing to the positive nature of the feed of the material in the part 3 of the apparatus housing. The precompression is enhanced by the reciprocating movement of the plunger 4 which periodically blocks the outlet or discharge opening of the part 3 of the housing. With each rearward (reverse) stroke of the plunger 4 the precompressed material at once enters the space vacated by the plunger 4 and, on the next forward stroke of the plunger 4, is discharged into the moulding die or press cylinder 20 (in the direction of arrow B). Of great importance in this matter of procedure are the cutting means or organs, which in the embodiment illustrated are constituted by the knives 7 and 8, are provided at the lower end of the worm conveyor 6 and continuously cut through the precompressed material so as to thereby prevent so-called bridge formation and to prevent a pressure increase in the lower part of the worm conveyor.

The press 20 shown in FIGS. 2 and 3 consists of a substantially cylindrical jacket made in one piece. The cylinder may be divided into a feed-in part 21 with a bore 24 tapering in the direction of flow of the material to be pressed.

The cylinder is intended to be mounted on a briquetting press and to this end is provided on its outer side with a limiting collar or flange 25. Interchangeable wearing parts may be mounted and fixed for example by means of a holder ring (not shown) in the tapholes 26. For cooling the cylinder, longitudinal bores 27 are provided which are connected together at both ends by transverse bores 28, 29 so that the circulation of a coolant is made possible. The longitudinal bores are closed at the outlet end of the cylinder by threaded bolts 30.

The discharge part 23 is provided on its lower side with a slot 32 beginning at a bore 31 and passing longitudinally along the cylinder. Seen in cross section (FIG. 3), the slot 32 outwardly tapers from the inside of the jacket to the outside thereof. In other words, the boundary walls of such slot 32 are inclined with respect to one another, as shown, so that the slot possesses a substantially V-shaped cross section, resulting in the width of the slot increasing from the inner wall of the jacket to the outer wall thereof, as best shown by referring to FIG. 3.

This slot 32 enables the diameter of the discharge part 23 of the cylinder and thus the surface pressure on the material to be pressed, to be varied. This is effected by means of a hydraulic adjusting device (not shown) acting upon the area 33 of the cylinder jacket.

What I claim is:

1. Press for manufacturing cylindrical objects from loose fibrous or particulate material, comprising: a feed apparatus for the material to be pressed having a housing with a funnel-shaped infeed part and a cylindrical feed part provided with a discharge opening, a conveyor means provided at its end with cutting means for the material to be pressed, said cylindrical feed part closely surrounding at least an end portion of said conveyor means provided at said end with said cutting means; a thruster mechanism mounted at the end of said cylindrical part of the feed apparatus housing to discharge material therefrom through said discharge opening and having a plunger means driven for moving back and forth transversely through said cylindrical part of the feed apparatus housing thereby alternately blocking and freeing said discharge opening of said cylindrical part of said feed apparatus housing; and a cylindrical die mounted at said discharge opening in alignment with said plunger means.

2. A press according to claim 1, wherein said cutting means include at least one elongate knife having a cutting edge extending away from said end of said conveyor means, parallel with respect to the axis of said conveyor means, to a point a short distance in front of the working space of said plunger of said thruster mechanism.

3. A press according to claim 1, wherein said cutting means are constituted by two knives which project from said end of said conveyor means and in a direction parallel to the axis of said conveyor means, said knives being located at different distances from the axis of said conveyor means.

4. A press for manufacturing cylindrical objects from loose fibrous or particulate material, comprising: a feed apparatus for the material to be pressed having a housing with a material infeed part and a cylindrical feed part provided with a discharge opening, a worm conveyor which is provided at its outlet end with cutting means for the material to be pressed and further having an infinitely variable speed transmission for driving said worm conveyor, said cylindrical feed part closely surrounding at least an end portion of said conveyor means provided at said outlet end with said cutting means; a thruster mechanism mounted at the end of said cylindrical part of the feed apparatus housing to discharge material therefrom through said discharge opening and having a plunger means driven for moving back and forth transversely through said cylindrical part of the feed apparatus housing, thereby alternately blocking and freeing said discharge opening of said cylindrical part of said feed apparatus housing; and a cylindrical die mounted at said discharge opening in alignment with said plunger means.

5. A press for manufacturing cylindrical objects from loose fibrous for particulate material, comprising:

a feed apparatus for the material to be pressed having a housing with a funnel-shaped infeed part and a cylindrical feed part provided with a discharge opening, a conveyor means which is provided at its end with cutting means for the material to be pressed, said cylindrical feed part closely surrounding at least an end portion of said conveyor means provided at said end with said cutting means;

a thruster mechanism mounted at the end of said cylindrical part of the feed apparatus housing to discharge material therefrom through said discharge opening and having a plunger means driven for moving back and forth transversely through said cylindrical part of the feed apparatus housing, thereby alternately blocking and freeing said discharge opening of said cylindrical part of said feed apparatus housing;

and a cylindrical die having an outlet end mounted at said discharge opening in alignment with said plunger means, said cylindrical die having a cylinder jacket provided with at least one continuous slot extending from near the entrance of said discharge opening to said outlet end of said die, said slot, as seen in cross section, outwardly tapering from the inside of said jacket to the outside thereof.

6. A press according to claim 5, wherein the said slot in said die passes longitudinally along said cylindrical jacket.

7. A press according to claim 5, wherein said slot in said die is located on the lower side of said cylindrical jacket which extends substantially horizontally.